US005714234A

United States Patent [19]

Robertson

[11] Patent Number: 5,714,234

[45] **Date of Patent: *Feb. 3, 1998**

[54] IDENTIFICATION TAG WITH PREFORM ATTACHMENT

[75] Inventor: John A. Robertson, Chillicothe, Ohio

[73] Assignee: Infosight Corporation, Chillicothe, Ohio

[ * ] Notice: The term of this patent shall not extend beyond the expiration date of Pat. No. 5,422,167.

[21] Appl. No.: 661,064

[22] Filed: Jun. 10, 1996

[51] Int. Cl.$^6$ .......... B32B 9/00

[52] U.S. Cl. .......... 428/195; 428/204; 428/209; 428/213; 428/425.8; 428/446; 428/450; 428/457; 428/594; 525/289; 525/479; 427/289

[58] Field of Search .......... 428/450, 457, 428/425.8, 594, 209, 204, 195, 213, 446; 427/289; 29/462, 458, 446; 525/289, 479

[56] References Cited

U.S. PATENT DOCUMENTS

| | | | |
|---|---|---|---|
| 4,321,290 | 3/1982 | Thams | 427/289 |
| 4,743,890 | 5/1988 | Hilzinger et al. | 340/551 |
| 4,873,298 | 10/1989 | Ryntz | 524/479 |
| 5,422,167 | 6/1995 | Robertson et al. | 428/195 |
| 5,484,099 | 1/1996 | Robertson et al. | 228/176 |

*Primary Examiner*—Patrick Ryan
*Assistant Examiner*—Abraham Bahta
*Attorney, Agent, or Firm*—Mueller and Smith, LPA

[57] ABSTRACT

Broadly, the present invention is directed to a method for making a metal tag bearing visible indicia thereon and which can be welded onto a substrate. Such inventive method commences by providing a metal sheet having (1) a painted zone upon which is imprinted visible indicia, and (2) a bare metal zone, to form said tag. A preform is attached to said bare metal zone, preferably by welding. The preform has a depression adapted to receive weld wire for welding said tag to said metal substrate. Preferably, the depression is a hole penetrating through the preform to the bare metal zone. The preform also is thicker than the metal tag, and of thickness effective for it being attached to metal by welding. The metal tag is attached to the substrate by inserting a weld wire through the preform hole to make contact with the tag bare metal zone and welding the metal tag to said substrate. Also disclosed is a metal tag bearing indicia thereon and which can be welded onto a metal substrate.

19 Claims, 2 Drawing Sheets

IDENTIFICATION TAG WITH PREFORM ATTACHMENT

BACKGROUND OF THE INVENTION

The present invention relates to the marking of metal for tracking and identification purposes, and more particularly to using laser marked painted metal zones therefor.

Primary metal mills require that their products be accurately identified. Molten metal batches have unique "heat" (batch) chemistries which affect the mechanical properties of the ultimate (further formed) end products. Tracking the many individual pieces produced from a beat is a difficult, time consuming process with many opportunities for error in the stressful (hot, noisy, dimly lit, and physically dangerous) mill environment.

Metals first exit the molten heat as very hot (e.g., 1,800° F. or 982° C.) slabs or billets. Ideally, these slabs and billets should be identified with bar coded information immediately after they solidify and while they are still on the run out tables (before they can be mixed up). Automatic identification (e.g., bar codes) are preferred because they help eliminate the errors inherent in manual marking and reading (estimated by some to be as high as 1 in 300 attempts).

High temperature tags (some with bar codes) have been used for some time. For example, one commercial tag (supplied by Pannier Corp., Pittsburgh, Pa.) is a relatively thin (e.g. 0.008 in or 0.2032 mm thick) stainless steel tags which are coated with a high temperature white coating and are printable on-site using a dot matrix impact (inked ribbon) printer. These tags then are manually affixed to the slab or billet using a powder charged or pneumatically driven nail gun. Efforts to automate this prior an tag have generally not been successful because the dot matrix printer mechanism is "delicate" (dot matrix head and ribbon) and does not survive well in the vicinity of hot/dirty products; and the printer ribbon needs frequent replacement (e.g., every 300 tags), especially if high contrast bar codes are desired. Further, the nailing mechanism is difficult to automate as the environment is not conducive to bowl feeders. Nail "sticks" are limited to, say, 50 nails and stick feeds are unproved. Also, nailing becomes less acceptable (it is a foreign imperfection) and attachment is less reliable in premium (harder) grades of metal. Finally, nailing is increasingly unreliable as the product cools (hardens).

Another proposal is found in U.S. Pat. No. 5,422,167 which discloses a label that is formed from a sheet of metal having a face and a back. The sheet face is coated with a layer of paint that is resistant to temperature of the hot metal stock and receptive to being thermally transfer printed. The metal sheet label is of a thickness so that the paint layer can be thermally transfer printed using conventional markers designed for paper or films. The printed label is adapted to be attached to hot (1,200° F. or 649° C.) metal stock by welding bare (unpainted) zones of the label. This tag system can withstand the rigors of, for example, steel coil or "hot bands" production and can be attached by welding.

Another proposal is found in commonly-assigned application Ser. No. 08/661/063, filed on even date herewith (attorney docket INF 2-008), which includes the steps of: (a) forming on the product or on a tag to be attached to the product a layer of coating containing an additive that is darkenable under the action of a $CO_2$ laser beam to form product identification indicia; (b) providing a raster-scanning infrared laser beam emitting $CO_2$ laser, (c) effecting impingement of said laser beam from said laser onto said coating layer, wherein one or more of said laser beam or said coating layer moves in the X-axis for said laser beam to form said product identification indicia from said additive that is darkened by said laser beam; and (d) if the coating layer was applied to a tag, attaching the tag to said product. Alternatively, the coating layer can be moved while the $CO_2$ laser remains stationary. The zone can be an area on the metal product that has been coated with a layer of the coating or can be a metal tag that has been coated with a layer of the coating.

Still, there exists a need in the an for a tag and identification system that can withstand the rigors of primary metal mills and in which the tag production and affixation are automated in order to provide significant labor savings (e.g., at least 1 worker per shift) and to eliminate the errors resulting from manual application (e.g., shuffled tags, sequences out of step by one, and the like).

Additionally, a variety of other raw and finished goods (e.g., automobile mechanical pans, tires, etc.) require marking for identification purposes. Such goods may be at or below room temperature when the marking requirement arises. A system that has the flexibility to mark "hot" metal as well as lower temperature items would be welcome.

BROAD STATEMENT OF THE INVENTION

Broadly, the present invention is directed to a method for making a metal tag bearing visible indicia thereon and which can be welded onto a substrate. Such inventive method commences by providing a metal sheet having (1) a painted zone upon which is imprinted visible indicia, and (2) a bare metal zone, to form said tag. A preform is attached to said bare metal zone, preferably by welding. The preform has a depression adapted to receive weld wire for welding said tag to said metal substrate. Preferably, the depression is a hole penetrating through the preform to the bare metal zone. The preform also is thicker than the metal tag, and of thickness effective for it being attached to metal by welding. The metal tag is attached to the substrate by inserting a weld wire through the preform hole to make contact with the tag bare metal zone and welding the metal tag to said substrate.

Also disclosed is a metal tag bearing indicia thereon and which can be welded onto a metal substrate. Such metal tag has a painted zone upon which is imprinted visible indicia and has a bare zone, a metal preform that has been welded to said metal tag at said bare zone wherein the preform has a hole or depression penetrating therethrough to the tag bare zone.

Advantages of the present invention include a identification system that can withstand the rigors of primary metal mills, yet can be fully automated. Another advantage is an identification system that can provide both alphanumeric characters as web as graphics. A further advantage is the ability to use thin, preferably stainless tags, yet be able to attach such tags to hot scaly metal billets and slabs. Yet another advantage is the ability to reliably attach the inventive tags to cold and hot substrates by conventional MIG welding techniques. These and other advantages will be readily apparent to those skilled in the art based on the disclosure contained herein.

These drawings will be described below in connection with the disclosure contained herein.

DETAILED DESCRIPTION OF THE INVENTION

Hot slabs or billets typically are at a temperature of up to about 1850° F. At much higher temperatures, ceramic adhesives could be used to affix labels to steel or other metal products; however, they usually crack upon cooling due to temperature coefficient differences. At temperatures much below about 600° F., organic adhesives can be used to affix labels to metal products. Above 1200° F., however, neither ceramic nor organic adhesives are appropriate for affixing or securing labels to hot slabs or billets. Thus, the ability to weld the inventive labels to the hot slabs or billets itself represents an advancement in the tagging of hot stock.

With relatively thin tags using MIG (GMAW or gas metal arc welding, see *Welding Handbook*, Volume 2, Eighth Edition, American Welding Society, Chapter 4, pages 110–155)or TIG (GTAW or gas tungsten arc welding, see *Welding Handbook*, Volume 2, Eighth Edition, American Welding Society, Chapter 3, pages 74–107) welding techniques, the thin tag material typically is "blown" out and the weld, if any, is a weak meniscus about the hole in the tag (these references being expressly incorporated herein by reference). Additionally, the arc initiation is unreliable due to variable scale on the product as well as the resistive tag coating.

Figure 1:
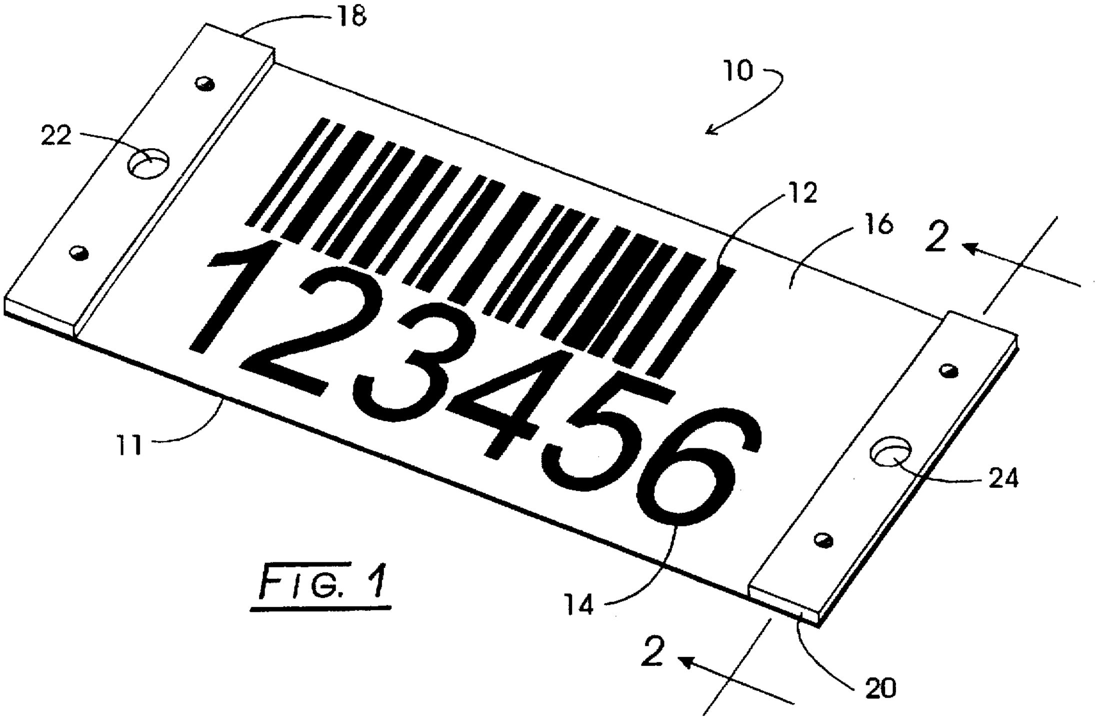
FIG. 1 is an overhead perspective view of the inventive tag having beth bar code and numbers identification and having a pair of preforms.

The use of a thicker "preform", as is proposed herein, permits reliable MIG welding. As shown at FIG. 1, inventive tag 10 is shown to be rectangular in shape (although, any shape can be used) and containing machine readable picket fence printed bar code 12 and human readable characters 14 corresponding to bar code 12; although, the machine readable and human readable characters need not be routinely present or correspond in content. It is this information that tag 10 conveys concerning the substrate or object to which it is to be attached.

Tag 10 typically is between about 0.1 and 0.5 mm thick and typically is fabricated from stainless steel sheet 11 for high temperature survival. Coating 16, typically a white coating ranging between about 0.05 and 2 mm in thickness, is applied to the top face of sheet 11 to provide a darkenable background for bar code 12 and characters 14. Preforms 18 and 20 are shown at either longitudinal end of tag 10. The areas or zones beneath preforms 18 and 20 either are uncoated by coating 16 or have had coating 16 removed from sheet 11 to expose the bare metal forming sheet 11 from which tag 10 has been fabricated.

Figure 2:
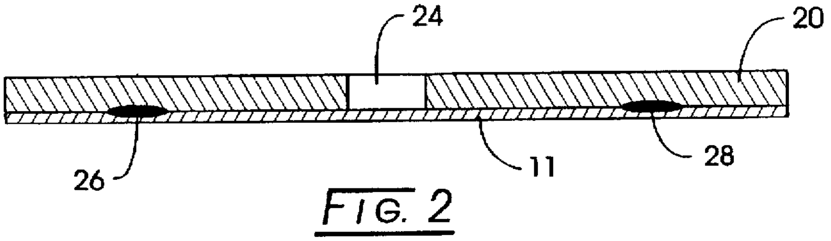
FIG. 2 is a sectional view through one of the preforms of the tag of FIG. 1 taken along line 2—2.

Preforms 18 and 20 contain depressions 22 and 24, respectively, adapted to receive weld wire for attachment of the tags to metal substrate. Preferably, depressions 22 and 24 are holes which a expose clean bare metal surface of metal sheet 11 for later welding wire contact during the attachment sequence of the present invention. As can be seen by referring to FIG. 2 which depicts preform 20 in cross-sectional view with preform 18 being identical thereto, preform 20 was attached (preferably at the tag manufacturing factory) to metal sheet 11 by spot welds 26 and 28. Preforms 18 and 20 are relatively thicker than sheet 11, typically about 0.5 to 3 mm in thickness, and may be fabricated from less expensive carbon steel rather than stainless steel as sheet 11 preferably is fabricated. The end bare areas of sheet 11 permit spot welding of preforms 18 and 20 to sheet 11.

Figure 3:
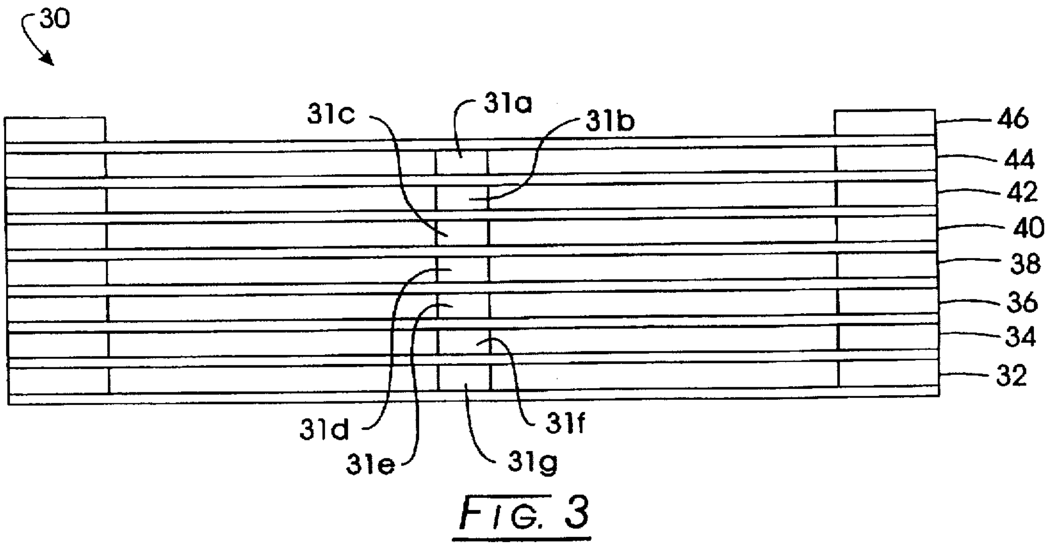
FIG. 3 is a side elevational view of a plurality of inventive tags in a stacked arrangement.

The unique construction of the inventive tags, such as tag 10, permit an array of tags to be vertically stacked as shown in FIG. 3. Array 30 is formed from tags 32–46. Such stacked array permits automated application equipment to be used at the mill in affixing the inventive tags to metal bands or other metal (hot or cold) stock, partially finished goods, and finished goods. Relatively long, say, >8 in, tags tend to sag when stacked in array 30 which makes use of automatic equipment to pick up the tags problematic. Thus, spacers 31*a*–*g* can be affixed (conveniently with, for example, adhesive) to the bottom of each tag. When manufactured from cardboard or other cellulosic (or similar) material, spacers 31*a*–*g* will be burned up when the tags are attached to a hot slab.

Array 30 is furnished to automated marking and weld application equipment which would perform the following sequential steps. Initially, tag 46 is picked up and fed through a marking zone. In the marking zone, tag 46 is marked, preferably by a laser in accordance with in commonly-assigned application Ser. No. 08/661,063, filed on even date herewith (attorney docket INF 2-008) which uses a long focal length laser that permits tag 20 to freely pass through the marking zone or traverse a raster scanned laser beam across a tag. The marked tag (e.g., bar codes, human readable characters, and graphics) then is brought into contact and retained by (e.g., vacuum platen) a welding head. The welding head then extends to press the tag against the product to be labeled. The attachment welds are made while the welding head makes contact with the preforms to establish the ground connection and while pressing the tag firmly against the product surface. Desirably, the tag can be held against a hot product for a time sufficient to heat the tag to a temperature approaching the product temperature in order to equilibrate the temperatures of the hot product and the tag. This temperature equilibration step will aid in preventing bowing of the tag which otherwise may result when a relatively cool tag is welded to a relatively hot product. Moreover, coating 16 may be cured by the heat supplied by hot product 48 (if coating 16 has not already been cured) in a process wherein wet or uncured coating 16 is immediately marked after coating and then placed in contact with the surface of hot product 48.

Figure 4:
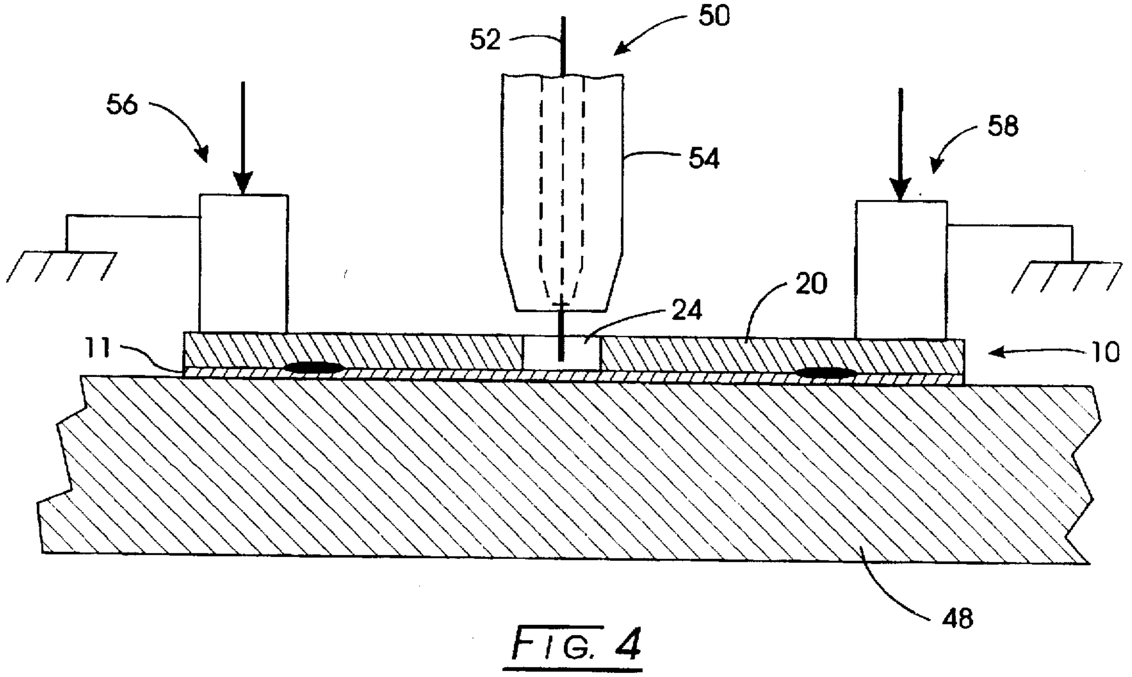
FIG. 4 is a cross-sectional elevational view through one of the preforms of the inventive tag being welded onto a substrate using gas metal arc welding (GMAW) or metal inert gas (MIG) welding process with pressure ground contacts.
Figure 5:
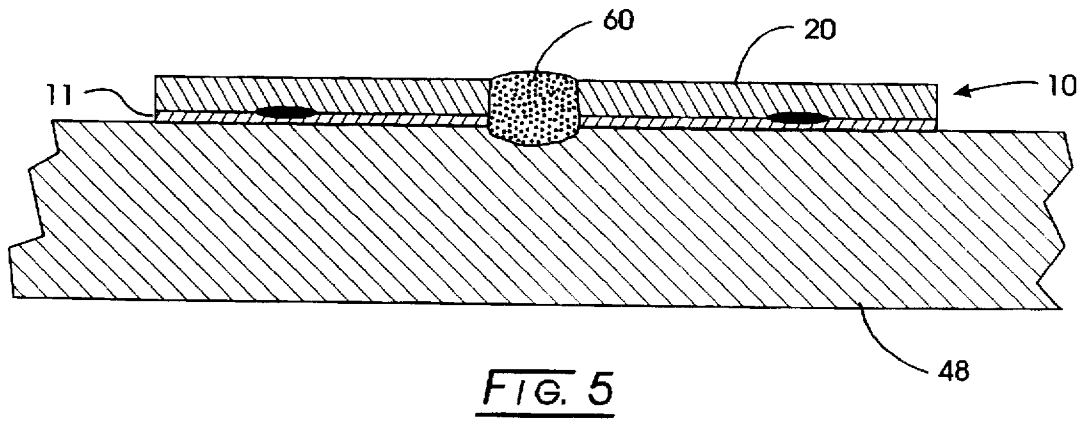
FIG. 5 is a cross-sectional elevational view like that in FIG. 4 showing the resultant weld-attached preform/label.

FIG. 4 depicts a welding head in position to weld an inventive tag onto a product In particular tag 10 is in tactile relationship with product 48 (e.g., a hot slab) held by pressure pads 56 and 58 which are connected to a source of ground. Welding head 50 is shown to include annular gas nozzle 54 through which a source of gas (e.g., argon) flows to shield the arc that is created by the welding head. Consumable electrode (wire) 52 is fed through gas nozzle 54 and into hole 24 of preform 20. The welding equipment is adjusted to operate as much in possible in a "spray" mode to maximize the depth of weld penetration into hole 24 and onto sheet 11 of tag 10. Weld 60 (FIG. 5) results from the welding operation and retains tag 10 firmly attached to product 48. Of course a similar welding head is used to weld preform 18 to product 48. By contacting weld wire 52 with the clean bare tag surface, reliable weld startup will be readily achieved even though the hot substrate is scaled.

In this regard, it will be appreciated that one or more preforms may be used to attached tag 10 to product 48. For that matter, more than one hole may be used in each preform, depending upon shape of the tag, shape of the preform, shape and type of product, and like factors. In fact, only one edge of tag 10 may be welde leaving the opposite end free. This configuration may permit sheet 11 to be lifted and cracked off at the edge of the preform. In fact, sheet 11 even may be scored at the inside edge of the preform to facilitate this crack off procedure of removing the tag once its function has been satisfied.

It should be appreciated that the foregoing descriptive is illustrative of the present invention and should not be construed as limiting it. All citations referred to herein are expressly incorporated herein by reference.

I claim:

1. Method for making a metal tag bearing visible indicia thereon and which tag can be welded onto a substrate, comprising the steps of:

(a) providing a metal sheet having (1) a coated zone upon which is imprinted visible indicia, and (2) a bare metal zone;

(b) attaching a preform to said bare metal zone to form said tag, said preform having a depression adapted to receive weld wire for welding said tag to said metal substrate, said preform being thicker than said metal sheet and of thickness effective for it being attached to metal by welding;

(c) placing said tag in contact with said substrate, inserting a weld wire through said preform hole to make contact with said sheet bare metal zone, and welding said tag to said substrate.

2. The method of claim 1, wherein said metal sheet is provided to be between about 0.1 and 0.5 mm thick and said preform is provided to be between about 0.5 and 3 mm thick.

3. The method of claim 1, wherein said painted zone is provided to be white.

4. The method of claim 1, wherein said preform is attached to said metal sheet by welding.

5. The method of claim 1, wherein said visible indicia is provided to be one or more of machine readable characters, human readable characters, or graphics.

6. The method of claim 1, wherein step (c) comprises gas metal arc welding.

7. The method of claim 1, wherein said sheet is provided to be rectangular and two preforms are provided attached to opposite ends of said sheet.

8. The method of claim 1, wherein said sheet is coated with a coating to form said coated zone and said tag is placed in contact with a substrate at a temperature adequate to cure said coating.

9. The method of claim 1, wherein said tag is placed in contact with said substrate for a time adequate for the temperature of said preform/metal sheet to equilibrate to be about the same as the temperature of said substrate.

10. The method of claim 1, wherein said depression comprises hole penetrating through said preform to said bare metal zone.

11. A metal tag bearing indicia thereon and which can be welded onto a metal substrate, which comprises:

a metal sheet having (1) a painted zone upon which is imprinted visible indicia and (2) a bare zone; and a metal preform that has been welded to said metal sheet at said bare zone, said preform having a depression adapted to receive weld wire for welding said tag to said metal substrate.

12. The metal tag of claim 11, wherein said metal sheet is between about 0.1 and 0.5 mm thick and said preform is between about 0.5 and 3 mm thick.

13. The metal tag of claim 11, wherein said painted zone is white.

14. The metal tag of claim 11, wherein said visible indicia is one or more of machine readable characters, human readable characters, or graphics.

15. The metal tag of claim 11, wherein said sheet is rectangular and two preforms are provided attached to opposite ends of said sheet.

16. The metal tag of claim 11, wherein said depression comprises a hole penetrating through said preform to said bare metal zone.

17. The metal tag of claim 11, wherein a spacer is attached to the center of said metal sheet on the side opposite said preforms.

18. A stacked array of the metal tags of claim 11.

19. A stacked army of the metal tags of claim 17.

* * * * *